US011326457B2

(12) United States Patent
Sakamoto

(10) Patent No.: US 11,326,457 B2
(45) Date of Patent: May 10, 2022

(54) BLADE AND MACHINE HAVING THE SAME

(71) Applicant: MITSUBISHI HEAVY INDUSTRIES, LTD., Tokyo (JP)

(72) Inventor: Yasuro Sakamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 95 days.

(21) Appl. No.: 16/691,137

(22) Filed: Nov. 21, 2019

(65) Prior Publication Data

US 2020/0270998 A1    Aug. 27, 2020

(30) Foreign Application Priority Data

Feb. 26, 2019    (JP) .............................. JP2019-032498

(51) Int. Cl.
*F01D 5/18*    (2006.01)
(52) U.S. Cl.
CPC ...................... *F01D 5/18* (2013.01)
(58) Field of Classification Search
CPC .......... F01D 5/187; F01D 5/186; F01D 5/518; F01D 5/141; F01D 5/145; F01D 5/20
See application file for complete search history.

(56) References Cited

U.S. PATENT DOCUMENTS 5,779,437 A * 7/1998 Abdel-Messeh ........ F01D 5/186
                                                              415/115
7,246,992 B2 * 7/2007 Lee .......................... B23H 9/10
                                                              415/115

10,107,104 B2 * 10/2018 Bloxham .............. F04D 29/542
10,280,757 B2 *  5/2019 Kupratis ................. F01D 5/145
2008/0273963 A1 * 11/2008 Spangler ................ F01D 5/186
                                                              415/115
2011/0135447 A1    6/2011 Guo et al.
(Continued)

FOREIGN PATENT DOCUMENTS

DE    10 2010 060 860 A1    6/2011
JP         2005-98203 A    4/2005
(Continued)

OTHER PUBLICATIONS

The Office Action dated Mar. 16, 2022, issued in counterpart DE application No. 102019008225.7. (9 pages).

*Primary Examiner* — Michael Lebentritt
*Assistant Examiner* — Brian Christopher Delrue
(74) *Attorney, Agent, or Firm* — WHDA, LLP

(57) ABSTRACT

A blade includes an airfoil portion including a pressure surface and a suction surface each extending between a leading edge and a trailing edge along a spanwise direction, and at least one communication hole extending m the airfoil portion and having a first and a second opening end opening to the pressure and suction surface, respectively. The first opening end is located on a first cross-section perpendicular to the spanwise direction at a first position in the spanwise direction, the second opening end is located on a second cross-section perpendicular to the spanwise direction at a second position in the spanwise direction, and a dimensionless blade chord length position of the first opening end with respect to the leading edge on the first cross-section is larger than a dimensionless blade chord length position of the second opening end with respect to the leading edge on the second cross-section.

14 Claims, 15 Drawing Sheets

(56) References Cited

U.S. PATENT DOCUMENTS

2014/0215998 A1* 8/2014 Goswami ................ F01D 5/145
60/39.1
2020/0269966 A1* 8/2020 Sakamoto ............... F01D 5/147

FOREIGN PATENT DOCUMENTS

| JP | 2014-181621 A | 9/2014 |
| WO | 2015/065659 A1 | 5/2015 |
| WO | 2018/196956 A1 | 11/2018 |

* cited by examiner

BLADE AND MACHINE HAVING THE SAME

TECHNICAL FIELD

This disclosure relates to a blade and a machine having the same.

BACKGROUND

With a blade applied to a machine such as a rotary machine and a fluid machine, there may be a case that loss occurs due to flow separation and the like in the vicinity of a blade surface, resulting in deterioration of machine performance and operation efficiency. In some cases, an airfoil is designed to reduce loss due to fluid separation and the like.

For example. Patent Document 1 discloses a turbine blade in which a bypass passage penetrating from a pressure side (pressure surface side) to a suction side (suction surface side) is arranged as being adjacent to a support wall surface in the vicinity of a maximum thickness part of an airfoil portion. In the turbine blade, owing to that part of operational fluid is bypassed from the pressure side to the suction side through the bypass passage at a position adjacent to the support wall surface, a pressure difference between the pressure side and the suction side in the vicinity of the support wall surface is reduced to suppress secondary flow and reduce flow loss.

CITATION LIST

Patent Literature

Patent Document 1: JP2005-98203A

SUMMARY

Recently, required specifications regarding operational conditions have been diversified for machines such as rotary machines, and in some cases, operation is performed under operational conditions deviated from a design point (e.g., partial load operation). Accordingly, a blade that is less likely to cause fluid separation even when operational conditions for a machine is deviated from a design point has been desired.

In this regard, it is an object of at least one embodiment of the present invention to provide a blade capable of suppressing separation which possibly occurs in the vicinity of a blade surface and a machine having the same.

(1) A blade according to at least one embodiment of the present invention includes an airfoil portion including a pressure surface and a suction surface each extending between a leading edge and a trailing edge along a spanwise direction, and at least one communication hole extending in the airfoil portion and having a first opening end opening to the pressure surface and a second opening end opening to the suction surface. Here, the first opening end is located on a first cross-section perpendicular to the spanwise direction at a first position in the spanwise direction, the second opening end is located on a second cross-section perpendicular to the spanwise direction at a second position in the spanwise direction, and a dimensionless blade chord length position (%) of the first opening end with respect to the leading edge on the first cross-section is larger than a dimensionless blade chord length position (%) of the second opening end with respect to the leading edge on the second cross-section.

According to design of a machine to which the blade is applied, in some cases, among a position on a pressure surface and a position on a suction surface of an airfoil portion both having the same static pressure during operation of the machine, the position on the pressure surface is closer to a trailing edge in the chord direction (blade chord direction). In this regard, according to the configuration described above as (1), since there is formed a communication hole having a first opening end and a second opening end located at positions, possibly having the same static pressure during operation, respectively on the pressure surface and the suction surface, a pressure difference is apt to occur between the position of the first opening end on the pressure surface and the position of the second opening end on the suction surface when operational conditions of the machine are deviated from a design point. Accordingly, it is possible to generate flow passing through the communication hole from one opening end, out of the first opening end and the second opening end, having a relatively high static pressure at the position on a blade surface i.e., the opening end on the high pressure side) toward the other opening end having a relatively low static pressure (i.e., the opening end on the low pressure side). Thus, the flow through the communication hole can be caused to come out onto the blade surface (i.e., the pressure surface or the suction surface) on which the corresponding opening end is located through the opening end on the low pressure side. Due to the flow coming out through the communication hole, separation of fluid flowing along a surface of the airfoil portion, which possibly occurs in the vicinity of the corresponding blade surface, can be effectively suppressed.

(2) In some embodiments, in the configuration described above as (1), a maximum value of cross-sectional area of the communication hole is not more than five times a minimum value of cross-sectional area of the communication hole.

According to the configuration described above as (2), the cross-sectional area of the communication hole does not vary largely from the first opening end down to the second opening end. Accordingly, a pressure loss at the communication hole can be effectively suppressed and separation of fluid flowing along the surface of the airfoil portion, which possibly occurs in the vicinity of the corresponding blade surface, can be suppressed more effectively.

(2') In some embodiments, in the configuration described above as (1) or (2), a maximum value of cross-sectional area of the communication hole at a midrange thereof is twice or more a minimum value of cross-sectional area of the communication hole, and alternatively, is triple or more a minimum value thereof.

According to the configuration described above as (2'), the cross-sectional area of the communication hole is large and flow velocity is reduced at the midrange between the first opening end and the second opening end. Accordingly, a pressure loss at the communication hole can be of suppressed and separation of fluid flowing along the surface of the airfoil portion, which possibly occurs in the vicinity of the corresponding blade surface, can be suppressed more effectively.

(3) In some embodiments, in the configuration described above as (1) or (2), on the first cross-section or the second cross-section, an angle A1 satisfying a condition (a) exists within an angle range between −10 degrees and 10 degrees both inclusive, around the leading edge being as a center, with respect to an extension line obtainable by extending a camber line of the airfoil portion from the leading edge; while the condition (a) is a condition that, when the airfoil portion receives fluid flow flowing from a direction of the angle A1 toward the leading edge, a static pressure at a position of the first opening end on the pressure surface is equal to a static pressure at a position of the second opening end on the suction surface.

In a machine to which the blade is applied, in some cases, fluid flowing toward the blade is designed to be oriented to follow the extension line obtainable by extending the camber line of the airfoil portion from the leading edge. In this regard, according to the configuration described above as (3), since the angle A1 satisfying the condition (a) exists, static pressures at the position of the first opening end on the pressure surface and the position of the second opening end on the suction surface are the same during operation at the design point of the machine. Meanwhile, a pressure difference is apt to occur between the position of the first opening end on the pressure surface and the position of the second opening end on the suction surface when the operational conditions of the machine are deviated from the design point. Accordingly, during operation at the design point of the machine, since there occurs little fluid flow through the first and second opening ends. It is possible to obtain aerodynamic performance in the same degree of that of a blade having the same shape without a communication hole. Then, when operational conditions of the machine deviate from the design point, it is possible to generate flow passing through the communication hole from one opening end, out of the first opening end and the second opening end, having a relatively high static pressure at the position on the blade surface (i.e., the opening end on the high pressure side) toward the other opening end having a relatively low static pressure (i.e., the opening end on the low pressure side). Thus, the flow through the communication hole can be caused to come out onto the blade surface (i.e., the pressure surface or the suction surface) on which the corresponding opening end is located through the opening end on the low pressure side even when operational conditions are deviated from the design point, while suppressing performance deterioration during operation at the design point. Due to the flow coming out through the communication hole, separation of fluid flowing along a surface of the airfoil portion, which possibly occurs in the vicinity of the con responding blade surface, can be effectively suppressed.

(4) In some embodiments, in the configuration described above as any one of (1) to (3), the second opening end is singularly included in each of the communication holes.

According to the configuration described above as (4), since each of the communication holes has only one second opening end, separation of fluid flowing along the surface of the airfoil portion, which possibly occurs in the vicinity of the corresponding blade surface, can be effectively suppressed by the flow coming out through the communication hole with a simple structure.

(5) In some embodiments, in the configuration described above as any one of (1) to (4), the first opening end is located closer to the leading edge than a point on the pressure surface having a tangential line parallel to a chord direction of the airfoil portion.

In a machine to which the blade is applied, when an incidence angle (elevation angle) of fluid toward the blade is negative (i.e., when fluid flow is oriented to collide with the suction surface compared to a case at a design point), in the vicinity of the pressure surface, separation may be apt to occur at a position closer to the trailing edge than the point on the pressure surface having the tangential line parallel to the chord direction. In this regard, according to the configuration described above as (5), since the first opening end is arranged closer to the leading edge than a position where separation is apt to occur in the vicinity of the pressure surface, fluid separation being apt to occur in the vicinity of the pressure surface when the incidence angle is negative can be effectively suppressed.

(6) In some embodiments, in the configuration described above as any one of (1) to (5), the second opening end is located closer to the leading edge than a point of an intersection between the suction surface and a straight line passing through the leading edge and being parallel to a camber line of the airfoil portion at the leading edge.

In a machine to which the blade is applied, when an incidence angle (elevation angle) of fluid toward the blade is positive (i.e., when fluid flow is oriented to collide with the pressure surface compared to a case at a design point), in the vicinity of the suction surface, separation may be apt to occur at a position closer to the trailing edge than the point of the intersection between the suction surface and the straight line passing through the leading edge and being parallel to the camber line of the airfoil portion at the leading edge. In this regard, according to the configuration described above as (6), since the second opening end is arranged closer to the leading edge than a position where separation is apt to occur in the vicinity of the suction surface, fluid separation being apt to occur in the vicinity of the suction surface when the incidence angle is positive can be effectively suppressed.

(7) In some embodiments, in the configuration described above as any one of (1) to (6), the communication hole extends linearly between the first opening end and the second opening end.

According to the configuration described above as (7), since the communication hole has a linear shape, the communication hole can be easily formed with machine processing.

(8) In some embodiments, in the configuration described above as any one of (1) to (7), an angle between the communication hole at the first opening end and a portion of a tangential line on the pressure surface at the first opening end, the portion being on the leading edge side from the first opening end, is 45 degrees or smaller.

According to the configuration described above as (8), since the communication hole is shaped along the pressure surface at the position of the first opening end, when flow from the communication hole comes out through the first opening end, a loss caused by being mixed with fluid flowing in the vicinity of the pressure surface can be effectively suppressed.

(9) In some embodiments, in the configuration described above as any one of (1) to (8), an angle between the communication hole at the second opening end and a portion of a tangential line on the suction surface at the second opening end, the portion being on the leading edge side from the second opening end, is 45 degrees or smaller.

According to the configuration described above as (9), since the communication hole is shaped along the suction surface at the position of the second opening end, when flow from the communication hole comes out through the second opening end, a loss caused by being mixed with fluid flowing in the vicinity of the suction surface can be effectively suppressed.

(10) In some embodiments, in the configuration described above as any one of (1) to (9), the first opening end and the second opening end are located at the same position in the spanwise direction.

According to the configuration described above as (10), since the first opening end and the second opening end are located at the same position in the spanwise direction, the communication hole can be formed relatively easily at the airfoil portion.

(11) In some embodiments, in the configuration described above as any one of (1) to (9), the first opening end and the second opening end are located at positions different from each other in the spanwise direction.

According to the configuration described above as (11), since the first opening end and the second opening end are located at positions different from each other in the spanwise direction, when static pressures at the positions on the blade surface are equivalent to each other, separation of fluid flowing along the surface of the airfoil portion, which possibly occurs in the vicinity of the corresponding blade surface can be effectively suppressed by the flow coming out through the communication hole.

(12) In some embodiments, in the configuration described above as any one of (1) to (11), at least one of the first opening end or the second opening end is located in a blade spanwise position range between 30% and 70% both inclusive, where 0% and 100% represent blade spanwise positions at both ends of the airfoil portion in the spanwise direction.

A center range in which a spanwise position is 30% or more and 70% or less may be important for performance in a machine to which the blade is applied. In this regard, according to the configuration described above as (12), at least one of the first opening end or the second opening end is located in the center range. Accordingly, in the region important for performance in the spanwise direction, separation of fluid flowing along the surface of the airfoil portion, which possibly occurs in the Vicinity of the corresponding blade surface, can be effectively suppressed by the flow coming out through the communication hole. Thus, the above is advantageous for performance of the machine to which the blade is applied.

(13) A blade according to at least one embodiment of the present invention includes an airfoil portion including a pressure surface and a suction surface each extending between a leading edge and a trailing edge along a spanwise direction, and at least one communication hole extending in the airfoil portion and having a first opening end opening to the pressure surface and a second opening end opening to the suction surface. Here, the first opening end is located on a first cross-section perpendicular to the spanwise direction at a first position in the spanwise direction; the second opening end is located on a second cross-section perpendicular to the spanwise direction at a second position in the spanwise direction; on the first cross-section or the second cross-section, an angle A1 that satisfies a condition (a) exists within an angle range between −10 degrees and 10 degrees both inclusive, with the leading edge being as a center, with respect to an extension line obtainable by extending a camber line of the airfoil portion from the leading edge; and the condition (a) is a condition that, when the airfoil portion receives fluid flow flowing from a direction of the angle A1 toward the leading edge, a static pressure at a position of the first opening end on the pressure surface is equal to a static pressure at a position of the second opening end on the suction surface.

In a machine to which the blade is applied, in some cases, fluid flowing toward the blade is designed to be oriented to follow the extension line obtainable by extending the camber line of the airfoil portion from the leading edge. In this regard, according to the configuration described above as (13), since the angle A1 satisfying the condition (a) exists, static pressures at the position of the first opening end on the pressure surface and the position of the second opening end on the suction surface are the same during operation at the design point of the machine. Meanwhile, a pressure difference is apt to occur between the position of the first opening end on the pressure surface and the position of the second opening end on the suction surface when the operational conditions of the machine are deviated from the design point. Accordingly, it is possible to generate flow passing through the communication hole from one opening end, out of the first opening end and the second opening end, having a relatively high static pressure at the position on the blade surface (i.e., the opening end on the high pressure side) toward the other opening end having a relatively low static pressure (i.e., the opening end on the low pressure side). Thus, as described above in (1), the flow through the communication hole can be caused to come out onto the blade surface (i.e., the pressure surface or the suction surface) on which the corresponding opening end is located through the opening end on the low pressure side. Due to the flow coming out through the communication hole, separation of fluid flowing along a surface of the airfoil portion, which possibly occurs in the vicinity of the corresponding blade surface, can be effectively suppressed.

(14) A machine according to at least one embodiment of the present invention includes the blade described above as any one of (1) to (13).

According to the configuration described above as (14), since there is formed a communication hole having a first opening end and a second opening end located at positions, possibly having the same static pressure during operation, respectively on the pressure surface and the suction surface, a pressure difference is apt to occur between the position of the first opening end on the pressure surface and the position of the second opening end on the suction surface when operational conditions of the machine are deviated from a design point. Accordingly, it is possible to generate flow passing through the communication hole from one opening end, out of the first opening end and the second opening end, having a relatively high static pressure at the position on a blade surface (i.e., the opening end on the high pressure side) toward the other opening end having a relatively low static pressure (i.e., the opening end on the low pressure side). Thus, the flow through the communication hole can be caused to conic out onto the blade surface (i.e., the pressure surface or the suction surface) on which the corresponding opening end is located through the opening end on the low pressure side. Due to the flow coming out through the communication hole, separation of fluid flowing along the surface of the airfoil portion, which possibly occurs in the vicinity of the corresponding blade surface, can be effectively suppressed.

(15) In some embodiments, in the configuration described above as (14), the first opening end and the second opening end are located at positions satisfying a condition (b), while the condition (b) is a condition that, during rated operation of the machine, a ratio PS1/PS2 of static pressure PS1 at a position of the first opening end on the pressure surface to static pressure PS2 at a position of the second opening end on the suction surface is in a range between 0.9 and 1.1 both inclusive.

According to the configuration described above as (15), the machine is designed to satisfy the condition (b). That is, the machine is designed so that, during rated operation, a difference between a static pressure at the position of the first opening end and a static pressure at the position of the second opening end is relatively small. Thus, during rated operation of the machine, the static pressure at the position of the first opening end on the pressure surface and the static pressure at the position of the second opening end on the suction surface are equivalent to each other. However, when operational conditions of the machine are deviated from rated conditions, a pressure difference is apt to occur between the position of the first opening end on the pressure surface and the position of the second opening end on the suction surface. Accordingly, during operation at the design point of the machine, since there occurs little fluid flow through the first and second opening ends, it is possible to obtain aerodynamic performance in the same degree of that of a blade having the same shape without a communication hole. Then, when operational conditions of the machine deviate from the design point, it is possible to generate flow passing through the communication hole from one opening end, out of the first opening end and the second opening end, having a relatively high static pressure at the position on the blade surface (i.e., the opening end on the high pressure side) toward the other opening end having a relatively low static pressure (i.e., the opening end on the low pressure side). Thus, the flow through the communication hole can be caused to come out onto the blade surface (i.e., the pressure surface or the suction surface) on which the corresponding, opening end is located through the opening end on the low pressure side even when operational conditions are deviated from the design point, while suppressing performance deterioration during operation at the design point. Due to the flow coming out through the communication hole, separation of fluid flowing along a surface of the airfoil portion, which possibly occurs in the vicinity of the corresponding blade surface, can be effectively suppressed.

According to at least one embodiment of the present invention, a blade capable of suppressing separation which possibly occurs in the vicinity of a blade surface and a machine having the same.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First, description will be provided on a gas turbine as an example of a machine to which a blade according to some embodiments are applied. Here, the machine according to the present invention may be a rotary machine such as a gas turbine or a fluid machine, or may be a machine other than the above.

Figure 1:
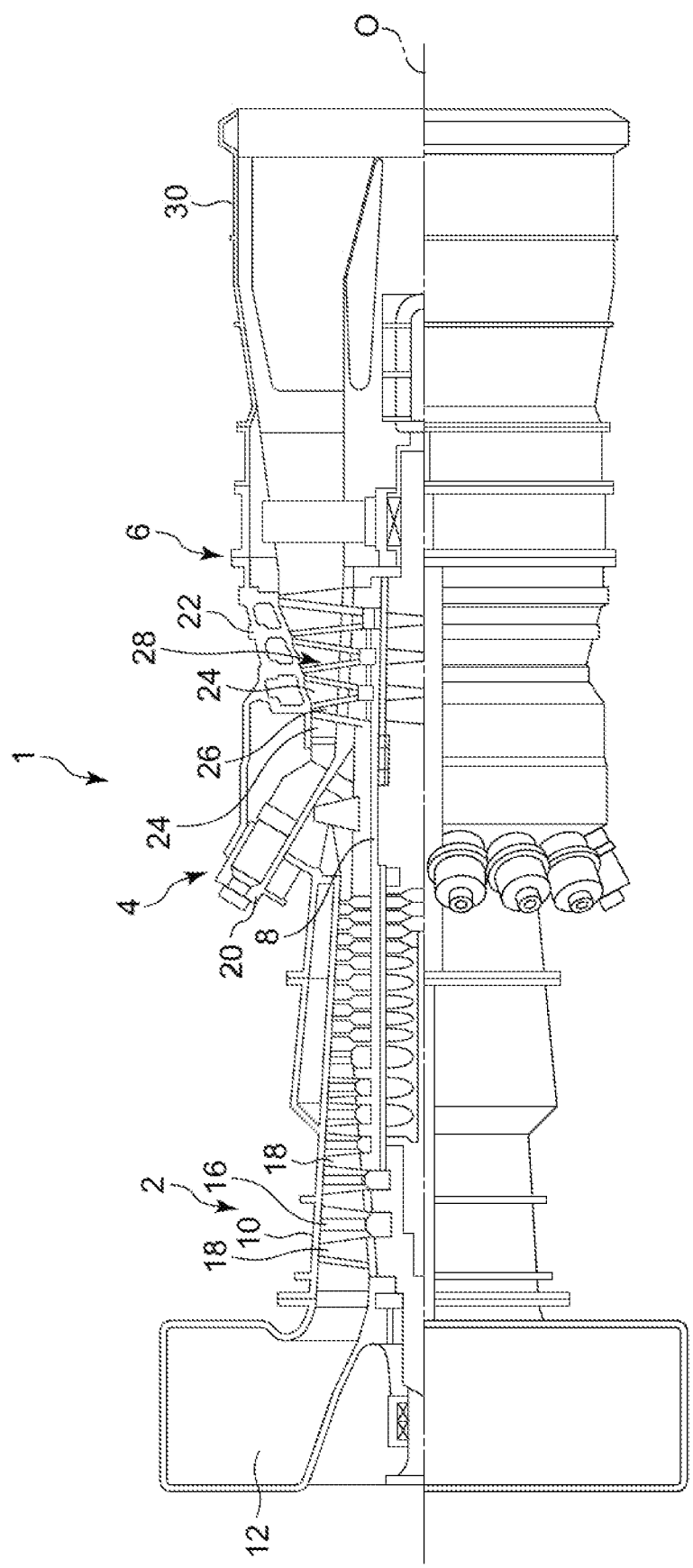
FIG. 1 is a schematic structural view of a gas turbine according to an embodiment.

FIG. 1 is a schematic structural view of a gas turbine according to an embodiment. As illustrated in FIG. 1, a gas turbine 1 includes a compressor 2 configured to generate compressed air, a combustor 4 configured to generate combustion gas using the compressed air and fuel, and a turbine 6 configured to be rotated by the combustion gas. When the gas turbine 1 is for power generation, an unillustrated power generator is connected to the turbine 6.

The compressor 2 includes a plurality of stator vanes 16 fixed to a compressor casing 10 side and a plurality of rotor blades 18 arranged at the rotor 8 as being arrayed alternately with respect to the stator vanes 16.

Air introduced through an air intake 12 is supplied to the compressor 2 and turned into compressed air at high temperature and high pressure by being compressed as passing through the stator vanes 16 and the rotor blades 18.

Fuel and compressed air generated at the compressor 2 are supplied to the combustor 4. Fuel burns in the combustor 4 and combustion gas as operational fluid of the turbine 6 is generated. As illustrated in FIG. 1, the gas turbine 1 includes a plurality of the combustors 4, in a casing 20, arranged along the circumferential direction about a rotor 8.

The turbine 6 includes a combustion gas passage 28 formed by a turbine casing 22, and a plurality of stator vanes 24 and a plurality of rotor blades 26 arranged on the combustion gas passage 28. The stator vanes 24 and the rotor blades 26 of the turbine 6 are arranged at the downstream side of the combustor 4 with respect to flow of the combustion gas.

The stator vanes 24 are fixed to the turbine casing 22 side. The stator vanes 24 arrayed along the circumferential direction of the rotor 8 configure a stator vane row. Further, the rotor blades 26 are arranged at the rotor 8. The rotor blades 26 arrayed along the circumferential direction of the rotor 8 configure a rotor blade row. The stator vane row and the rotor blade row are arrayed alternately in the axial direction of the rotor 8.

In the turbine 6, owing to that combustion gas flowed into the combustion gas passage 28 from the combustor 4 passes through the stator vanes 24 and the rotor blades 26, the rotor 8 is rotated, and thereby the power generator connected to the rotor 8 is driven to generate electric power. The combustion gas after driving the turbine 6 is discharged outside through a discharge chamber 30.

Next, description will be provided on blades according to some embodiments. Blades in some embodiments are applied to a rotary machine and may be arrayed around a rotor of a rotary machine. For example, the stator vane 24 or the rotor blade 26 of the turbine 6 of the gas turbine 1 described above may be a blade 32 to be described in the following. Further, blades in some embodiments may be components such as struts having a blade-like cross-sectional shape. In the following, description will be provided using the rotor blade 26 of the turbine 6 as an example of the blade 32.

Figure 2:
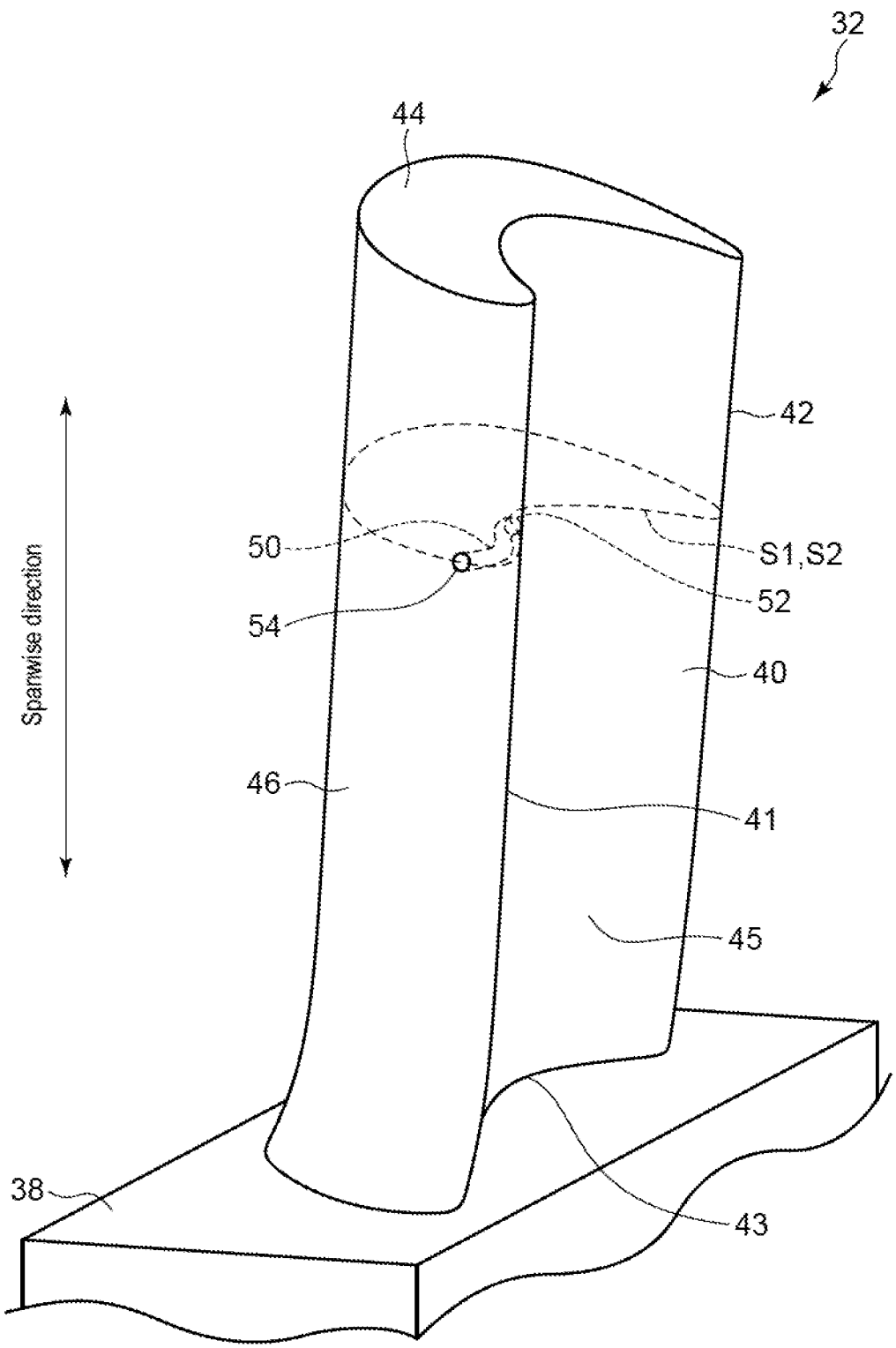
FIG. 2 is a perspective view of a blade according to an embodiment.
Figure 3:
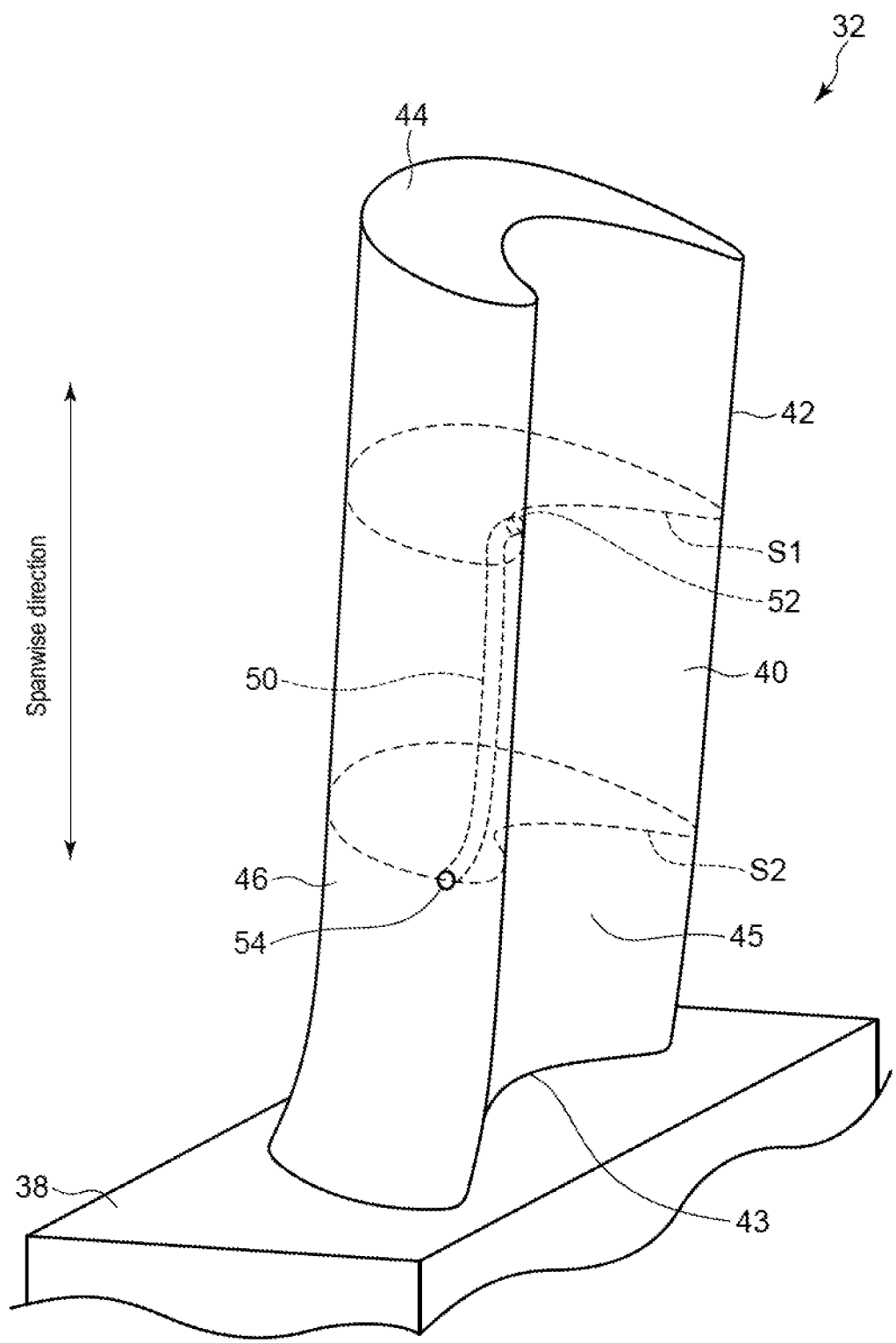
FIG. 3 is a perspective view of a blade according to an embodiment.

FIGS. 2 and 3 each are perspective views of the blade 32 according to an embodiment. As illustrated in FIGS. 2 and 3, the blade 32 includes an, airfoil portion 40 extending between a base end 43 and a tip end 44 in a spanwise direction. The base end 43 of the airfoil portion 40 is connected to a platform 38. The airfoil portion 40 includes a pressure surface 45 and a suction surface 46 each extending between a leading edge 41 and a trailing edge 42 along the spanwise direction. Viewing in the spanwise direction the pressure surface 45 has a concave shape concaved toward an inner side of the airfoil portion 40 and the suction surface 46 has a convex shape protruded outward from the inner side of the airfoil portion 40.

A communication hole 50 extending in the airfoil portion 40 is formed at the airfoil portion 40. The communication hole 50 has a first opening end 52 opening to the pressure surface 45 and a second opening end 54 opening to the suction surface 46. In the exemplary embodiments illustrated in FIGS. 2 and 3 the airfoil portion 40 has one communication hole 50. However, in other embodiments, the airfoil portion 40 may have a plurality of communication holes 50 as described later.

The first opening end 52 opening to the pressure surface 45 is located on a first cross-section S1 perpendicular to the spanwise direction at a first position in the spanwise direction. Further, the second opening end 54 opening to the suction surface 46 is located on a second cross-section S2 perpendicular to the spanwise direction at a second position in the spanwise direction.

In the exemplary embodiment illustrated in FIG. 2, in the spanwise direction, the first position where the first cross-section S1 is located and the second position where the second cross-section S2 is located are the same in position. That is, the first opening end 52 and the second opening end 54 are located on the same cross-section (the first cross-section S1 and the second cross-section S2). In the exemplary embodiment illustrated in FIG. 3, the first position where the first cross-section S1 is located is closer to the tip end 44 in the spanwise direction than the second position where the second cross-section S2 is located. That is, the first opening end 52 is opening to the pressure surface 45 at a position closer to the tip end 44 in the spanwise direction than the second opening end 54 opening to the suction surface 46.

In the embodiments illustrated in FIGS. 2 and 3, a dimensionless blade chord length position (dimensionless chord length position) X1(%) of the first opening end 52 with respect to the leading edge 41 on the first cross-section S1 is larger than a dimensionless blade chord length position X2(%) of the second opening end 54 with respect to the leading edge 41 on the second cross-section 52.

Figure 4A:
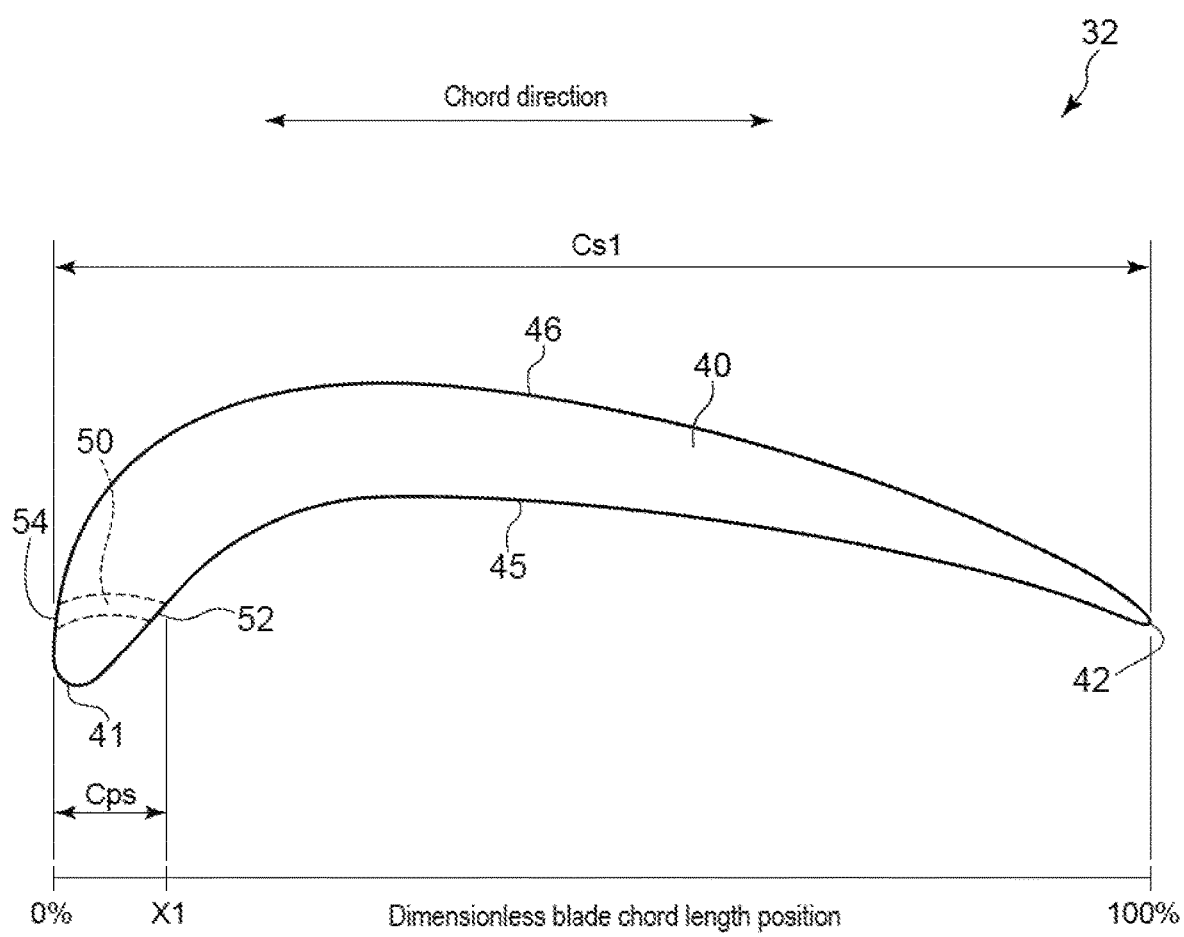
FIG. 4A is a schematic cross-sectional view of an airfoil portion on a first cross-section.
Figure 4B:
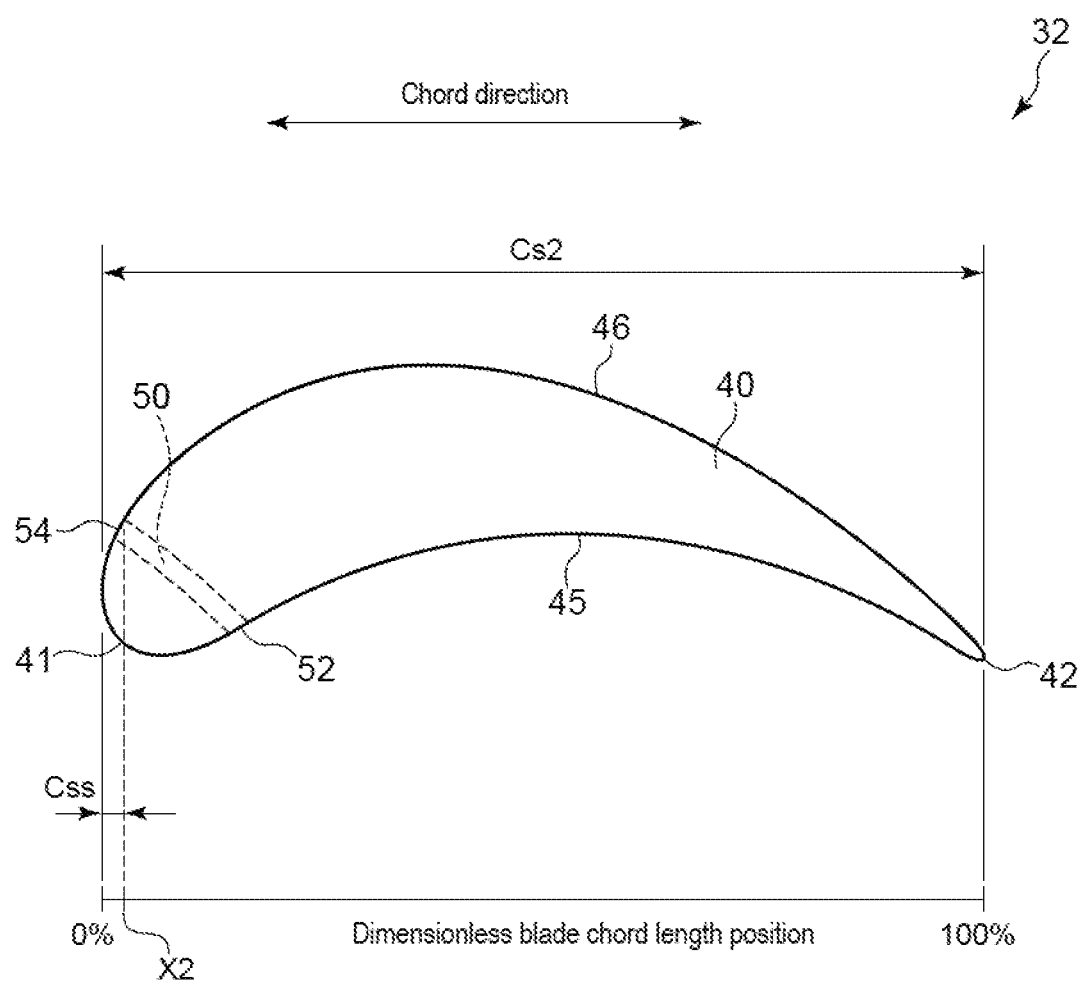
FIG. 4B is a schematic cross-sectional view of the airfoil portion on a second cross-section.

FIG. 4A is a schematic cross-sectional view of the airfoil portion 40 on the first cross-section S1. FIG. 4B is a schematic cross-sectional view of the airfoil portion 40 on the second cross-section 52. In FIGS. 4A and 4B, for the sake of explanation, the cross-sectional shape of the airfoil portion 40 on the first cross-section S1 is different from the cross-sectional shape of the airfoil portion 40 on the second cross-section S2. However, in the case that the first cross-section S1 and the second cross-section S2 are located at the same position in the spanwise direction (e.g., in the case of the embodiment illustrated in FIG. 2), the cross-sectional shape of the airfoil portion 40 on the first cross-section S1 and the cross-sectional shape of the airfoil portion 40 on the second cross-section S2 are the same.

In the present specification, in a cross-section perpendicular to the spanwise direction, a dimensionless blade chord length position (%) with respect to the leading edge 41 represents a position (%) assuming that, in the chord direction (blade chord direction: direction connecting the leading edge 41 and the trailing edge 42) on a corresponding cross-section, the position of the leading edge 41 is represented by 0(%) and the position of the trailing edge 42 is represented by 100(%).

For example, as illustrated in FIG. 4A, on the first cross-section S1, when length of the airfoil portion 40 in the chord direction is $C_{S1}$ and length in the chord direction from the leading edge 41 to the first opening end 52 is $C_{PS}$, the dimensionless blade chord length position X1 (%) of the first opening end 52 with respect to the leading edge 41 on the first cross-section S1 is $C_{PS}/C_{S1}$. Further, as illustrated in FIG. 4B, on the second cross-section S2, when length of the airfoil portion 40 in the chord direction is $C_{S2}$ and length in the chord direction from the leading edge 41 to the second opening end 54 is $C_{SS}$, the dimensionless blade chord length position X2 (%) of the second opening end 54 with respect to the leading edge 41 on the second cross-section S2 is $C_{SS}/C_{S2}$.

In the embodiment illustrated in FIG. 2, since the first cross-section S1 and the second cross-section S2 are located at the same position and the airfoil portion 40 has the same shape thereon, the length $C_{S1}$ of the airfoil portion 40 on the first cross-section S1 in the chord direction and the length $C_{S2}$ of the airfoil portion 40 on the second cross-section S2 in the chord direction are the same.

Even in the case that the cross-sectional shape of the airfoil portion 40 varies in the spanwise direction, that the airfoil portion 40 is twisted, or the like, the position of the first opening end 52 in the chord direction on the first cross-section S1 and the position of the second opening end 54 in the chord direction on the second cross-section S2 can be appropriately compared by using the dimensionless blade chord length position described above.

Figure 5:
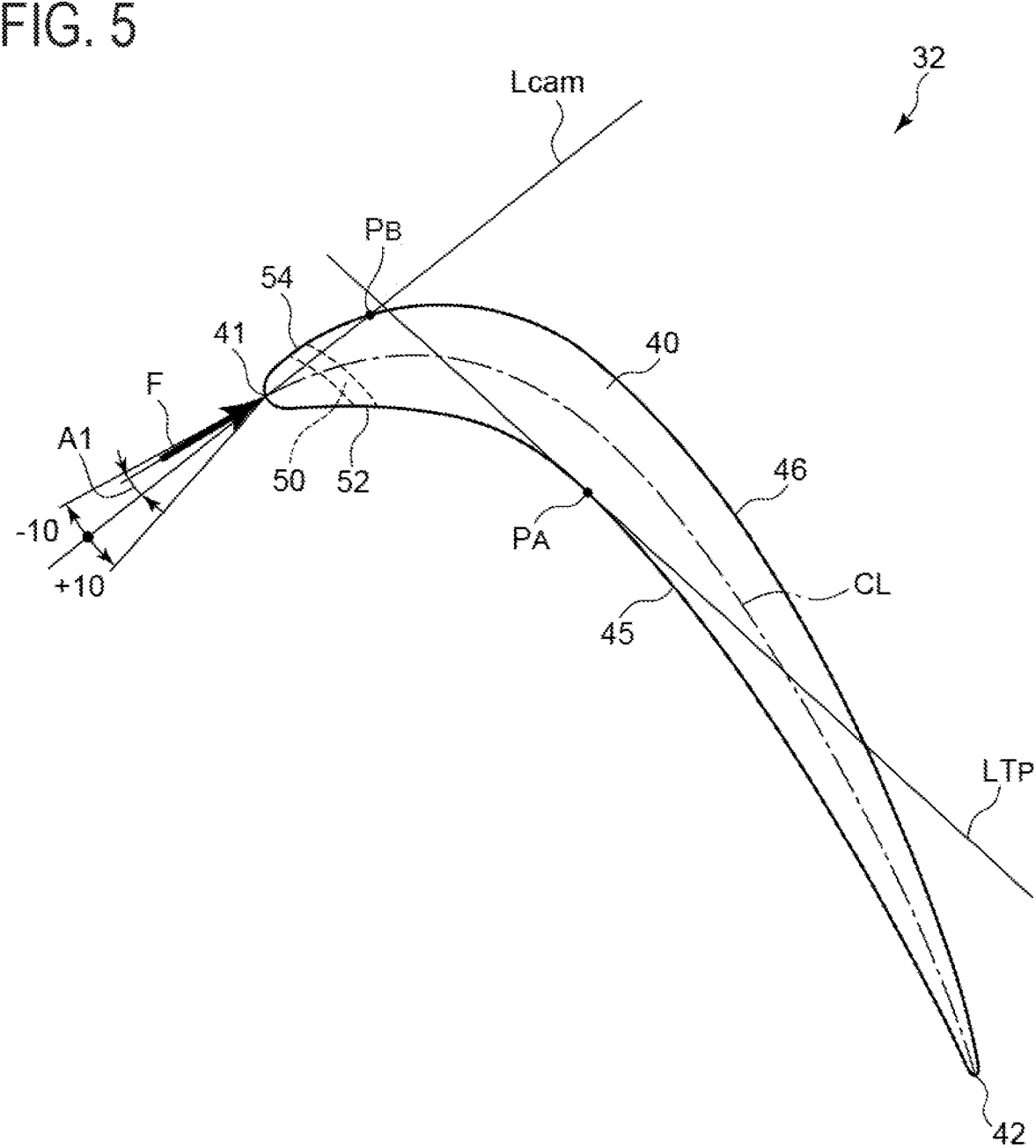
FIG. 5 is a view schematically illustrating the first cross-section or the second cross-section of an airfoil portion according to an embodiment.

Further, the blades 32 illustrated in FIGS. 2 and 3 have the following characteristics. FIG. 5 is a view schematically illustrating the airfoil portion 40 on the first cross-section S1 or the second cross-section S2 perpendicular to the spanwise direction.

Regarding the blades 32 illustrated in FIGS. 2 and 3, on the first cross-section S1 where the first opening end 52 is located or on the second cross-section S2 where the second opening end 54 is located in the spanwise direction, an angle A1 satisfying a condition (a) described below exists within an angle range between −10 degrees and 10 degrees both inclusive (see FIG. 5), around the leading edge 41 being as a center, with respect to an extension line obtainable by extending a camber line CL of the airfoil portion 40 from the leading edge 41. Here, the condition (a) is a condition that, when the airfoil portion 40 receives fluid flow flowing from a direction of the angle A1 toward the leading edge 41 (arrow F in FIG. 5), a static pressure at the position of the first opening end 52 on the pressure surface 45 is equal to a static pressure at the position of the second opening end 54 on the suction surface 46. Here, the extension line described above is a line segment on the leading side of the leading edge 41 (i.e., a line segment on the side opposite to the trailing edge 42 over the leading edge 41) out of a line Lcam being parallel to the camber line CL at the leading edge 41 and passing through the leading edge 41 (i.e., a straight line having an inclination of the camber line CL at the leading edge 41).

Further, the fluid flow direction is a relative direction with respect to the blade 32. That is, when the blade 32 is rotated along with the rotor 8 of the rotary machine, the fluid flow direction depends on circumferential velocity of the blade 32 and fluid velocity.

In the following description, an angle of the fluid flow direction toward the blade 32 with respect to a direction under operational conditions being at a design point (typically, the abovementioned extension line of the camber line CL) is represented by an incidence angle (elevation angle). That is, the incidence angle under operational conditions being at the design point is zero. Here, an incidence angle is positive for an angle of a direction to face the pressure surface 45, compared to a case at the design point, around the leading edge 41 being the center. That is, in FIG. 5, an incidence angle is positive on the counterclockwise direction from the leading edge 41 and negative on the clockwise direction therefrom.

In the case with the gas turbine 1 (see FIG. 1), the incidence angle of fluid to the rotor blade 26 as the blade 32 is apt to be negative under operation, the load of which is lower than operational conditions at the design point and apt to be positive under operation, the load of which is higher than operational conditions at the design point.

Figure 6:
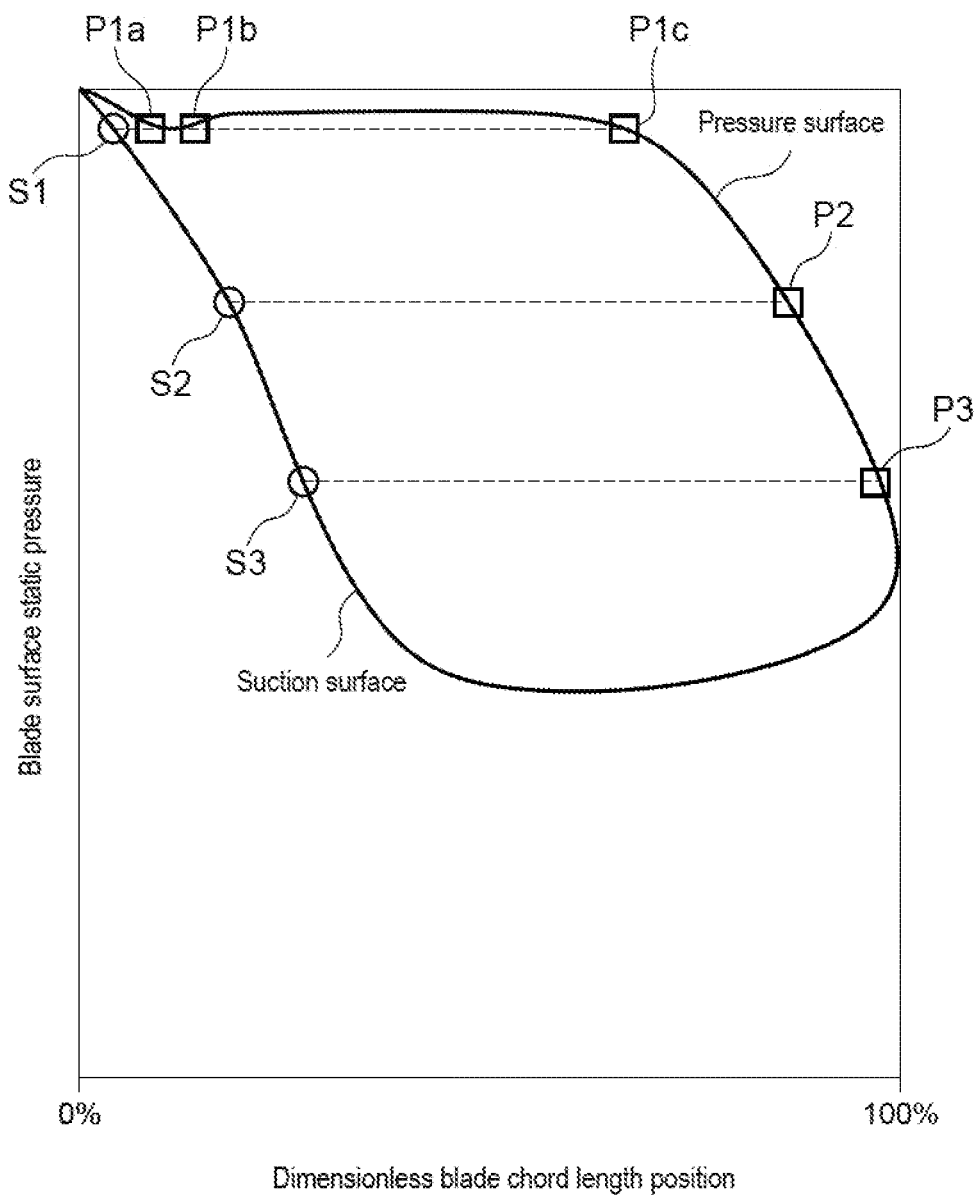
FIG. 6 is a graph illustrating an example of static pressure distribution on a blade surface according to an embodiment.
Figure 7:
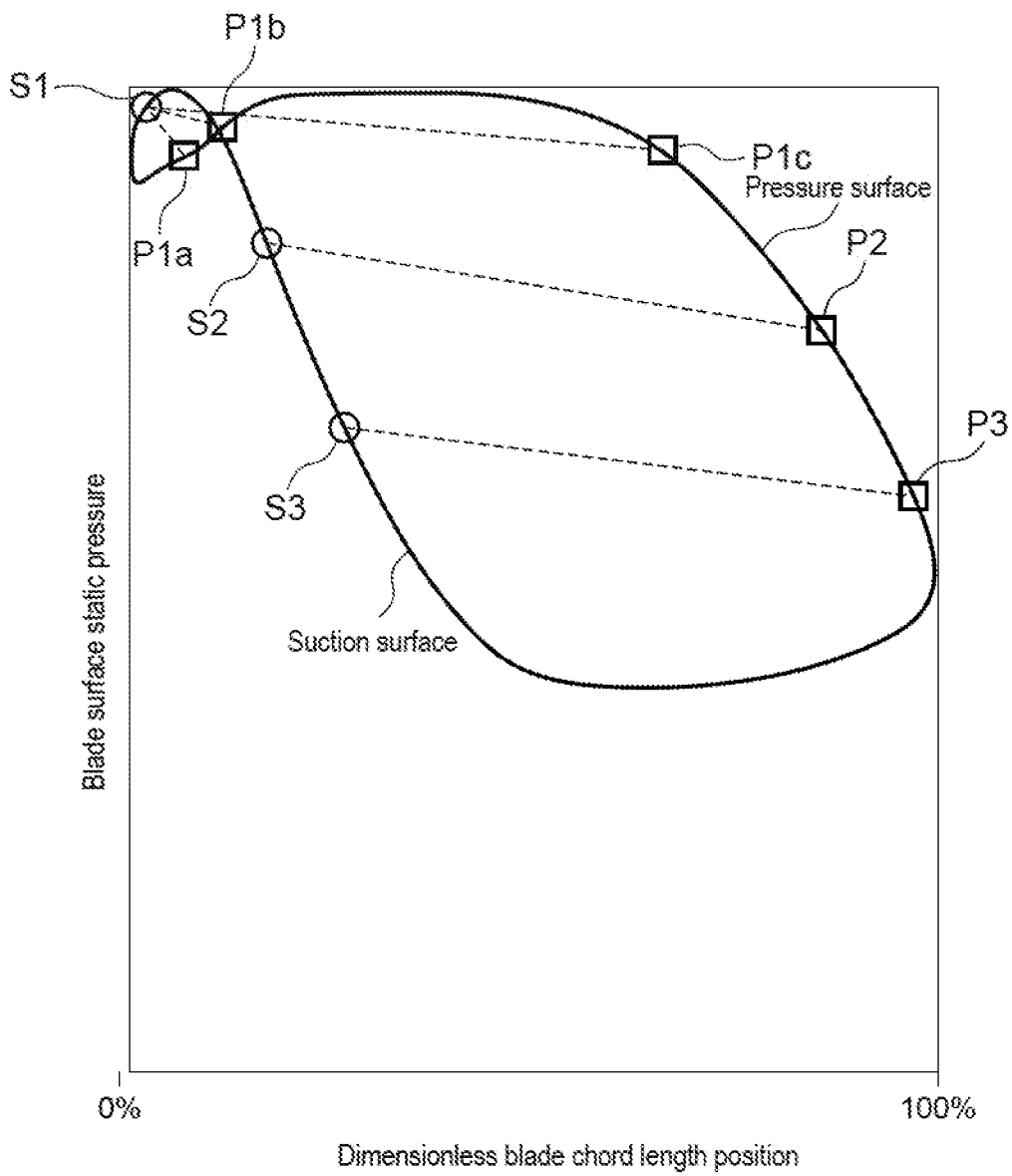
FIG. 7 is a graph illustrating an example of static pressure distribution on a blade surface according to an embodiment.
Figure 8:
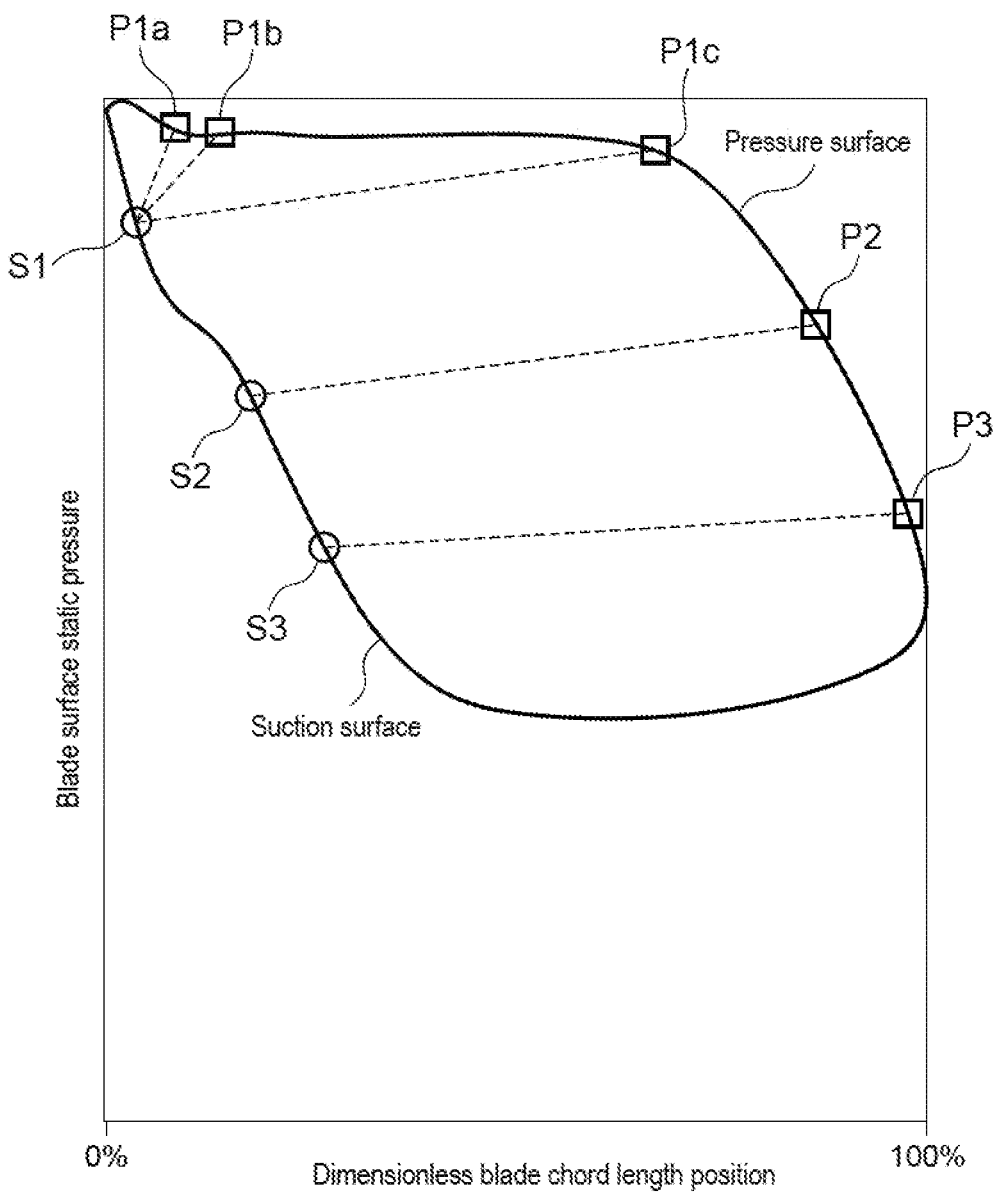
FIG. 8 is a graph illustrating an example of static pressure distribution on a blade surface according to an embodiment.

FIGS. 6 to 8 are graphs illustrating examples of static pressure distribution, under different conditions, on a blade surface of the blade 32 (i.e., on the pressure surface 45 and the suction surface 46) according to embodiments. Here, FIG. 6 is a graph under operational conditions being, at the design point (i.e., the incidence angle being zero). FIGS. 7 and 8 are graphs under operational conditions being deviated from the design point, while the incidence angle of fluid in FIG. 7 is negative and the incidence angle of fluid in FIG. 8 is positive.

Typically, static pressure distribution on a blade surface when operational conditions are at the design point i.e., the incidence angle is zero) has characteristics as illustrated by the graph of FIG. 6. Here, there exists a position on the pressure surface 45 and a position on, the suction surface 46 at which static pressures are the same. For example, in FIG. 6, under operational conditions being at the design point, a static pressure at a position S1 on the suction surface 46 is the same as static pressures at positions P1a, P1b, P1c on the pressure surface 45. Similarly, under operational conditions being at the design point, static pressures are the same at a position S2 on the suction surface 46 and a position P2 on the pressure surface 45 and static pressures are the same at a position S3 on the suction surface 46 and a position P3 on the pressure surface 45.

In a machine such as a rotary machine using the blade 32 having the abovementioned characteristics, when an incidence angle of fluid toward the blade 32 is deviated to a negative side from a design point with operational conditions deviated from the design point, fluid flow is apt to collide with the suction surface 46 and flow separation is apt to occur in the vicinity of the pressure surface 45.

Here, as illustrated in FIG. 7, the static pressure on the suction surface 46 side is relatively high in the static pressure distribution on the blade surface with a pressure difference occurring between the position on the pressure surface 45 and the position on the suction surface 46, at which the static pressures have been the same under operational conditions being at the design point. Specifically, for example, a static pressure at the position S1 on the suction surface 46 is higher than static pressures at the positions P1a to P1c on the pressure surface 45. Accordingly, for example, owing to that a communication hole 50 having the first opening end 52 at the position P1a on the pressure surface 45 and the second opening end 54 at the position S1 on the suction surface 46 is arranged, flow passing through the communication hole 50 occurs from the second opening end 54 having a relatively high pressure toward the first opening end 52 having a relatively low pressure when the incidence angle of fluid flowing toward the blade 32 is deviated to the negative side from the design point. This flow comes out onto the pressure surface 45 through the first opening end 52 and suppresses separation which possibly occurs in the vicinity of the pressure surface 45.

Similarly, in the case that the communication hole 50 is formed having the second opening end 54 and the first opening end 52 respectively at the position S1 on the suction surface 46 and the position P1b on the pressure surface 45, at the position S1 on the suction surface 46 and the position P1c on the pressure surface 45, at the position S2 on the suction surface 46 and the position P2 on the pressure surface 45, or at the position S3 on the suction surface 46 and the position P3 on the pressure surface 45, the similar effect can be obtained.

Further, in the machine such as the rotary machine, when an incidence angle of fluid toward the blade 32 is deviated to a positive side from the design point under operational conditions deviated from the design point, fluid flow is apt to collide with the pressure surface 45 and flow separation is apt to occur in the vicinity of the suction surface 46.

Here, as illustrated in FIG. 8, the static pressure on the pressure surface 45 side is relatively high in the static pressure distribution on the blade surface with a pressure difference occurring between the position on the pressure surface 45 and the position on the suction surface 46, at which the static pressures have been the same under operational conditions being at the design point. Specifically, for example, static pressures at the positions P1a to P1c on the pressure surface 45 are higher than a static pressure at the position S1 on the suction surface 46. Accordingly, for example, owing to that a communication hole 50 having the first opening end 52 at the position P1a on the pressure surface 45 and the second opening end 54 at the position S1 on the suction surface 46 is arranged, flow passing through the communication hole 50 occurs from the first opening end 52 having a relatively high pressure toward the second opening end 54 having a relatively low pressure when the incidence angle of fluid flowing toward the blade 32 is deviated to the positive side from the design point. This flow comes out onto the suction surface 46 through the second opening end 54 and suppresses separation which possibly occurs in the vicinity of the suction surface 46.

Similarly, in the case that the communication hole 50 is formed having the second opening end 54 and the first opening end 52 respectively at the position S1 on the suction surface 46 and the position P1b on the pressure surface 45, at the position S1 on the suction surface 46 and the position P1c on the pressure surface 45, at the position S2 on the suction surface 46 and the position P2 on the pressure surface 45, or at the position S3 on the suction surface 46 and the position P3 on the pressure surface 45, the similar effect can be obtained.

As is clear from the above description, in the embodiment described above, since the angle A1 satisfying the condition (a) exists, as described with reference to FIG. 6, static pressures at the position of the first opening end 52 on the pressure surface 45 and the position of the second opening end 54 on the suction surface 46 are the same dining operation at the design point of the machine (e.g., gas turbine 1). Meanwhile, as described with reference to FIGS. 7 and 8, a pressure difference occurs between the position of the first opening end 52 on the pressure surface 45 and the position of the second opening end 54 on the suction surface 46 when the operational conditions of the machine is deviated from the design point.

Accordingly, during operation at the design point of the machine, since there occurs little fluid flow through the first and second opening ends 52, 54, it is possible to obtain aerodynamic performance in the same degree of that of a blade having the same shape without a communication hole. Then, when operational conditions of the machine deviate from the design point, it is possible to generate flow passing through the communication hole 50 from one opening end, out of the first opening end 52 and the second opening end 54, having a relatively high static pressure at the position on the blade surface (i.e., the opening end on the high pressure side) toward the other opening end having a relatively low static pressure (i.e., the opening end on the low pressure side). Thus, the flow through the communication hole 50 can be caused to come out onto the blade surface (i.e., the pressure surface 45 or the suction surface 46) on which the corresponding opening end is located through the opening end on the low pressure side even when operational conditions are deviated from the design point, while suppressing performance deterioration during operation at the design point. Due to the flow coming out through the communication hole 50, separation of fluid flowing along a surface of the airfoil portion 40, which possibly occurs in the vicinity of the corresponding blade surface (the pressure surface 45 or the suction surface 46), can be effectively suppressed.

Here, as illustrated in FIG. 6, regarding the position on the pressure surface 45 at which the static pressure is the same as that at the corresponding position on the suction surface 46 under operational conditions being at the design point, the positions (P1a to P3) on the pressure surface 45 are closer to the trailing edge 42 in the chord direction respectively than the corresponding positions (S1 to S3) on the suction surface 46.

Thus, the abovementioned effects can be obtained by arranging the communication hole 50 so that the dimensionless blade chord length position X1 of the first opening end 52 with respect to the leading edge 41 on the first cross-section S1 is larger than the dimensionless blade chord length position of the second opening end 54 with respect to the leading edge 41 on the second cross-section S2, as in the embodiment described above. According to the above, the flow through the communication hole 50 can be caused to come out onto the blade surface (i.e., the pressure surface 45 or the suction surface 46) on which the corresponding opening end is located through the opening end on the low pressure side when operational conditions are deviated from the design point. Due to the flow coming out through the communication hole 50, separation of fluid flowing along a surface of the airfoil portion 40, which possibly occurs in the vicinity of the corresponding blade surface, can be effectively suppressed.

Figure 9:
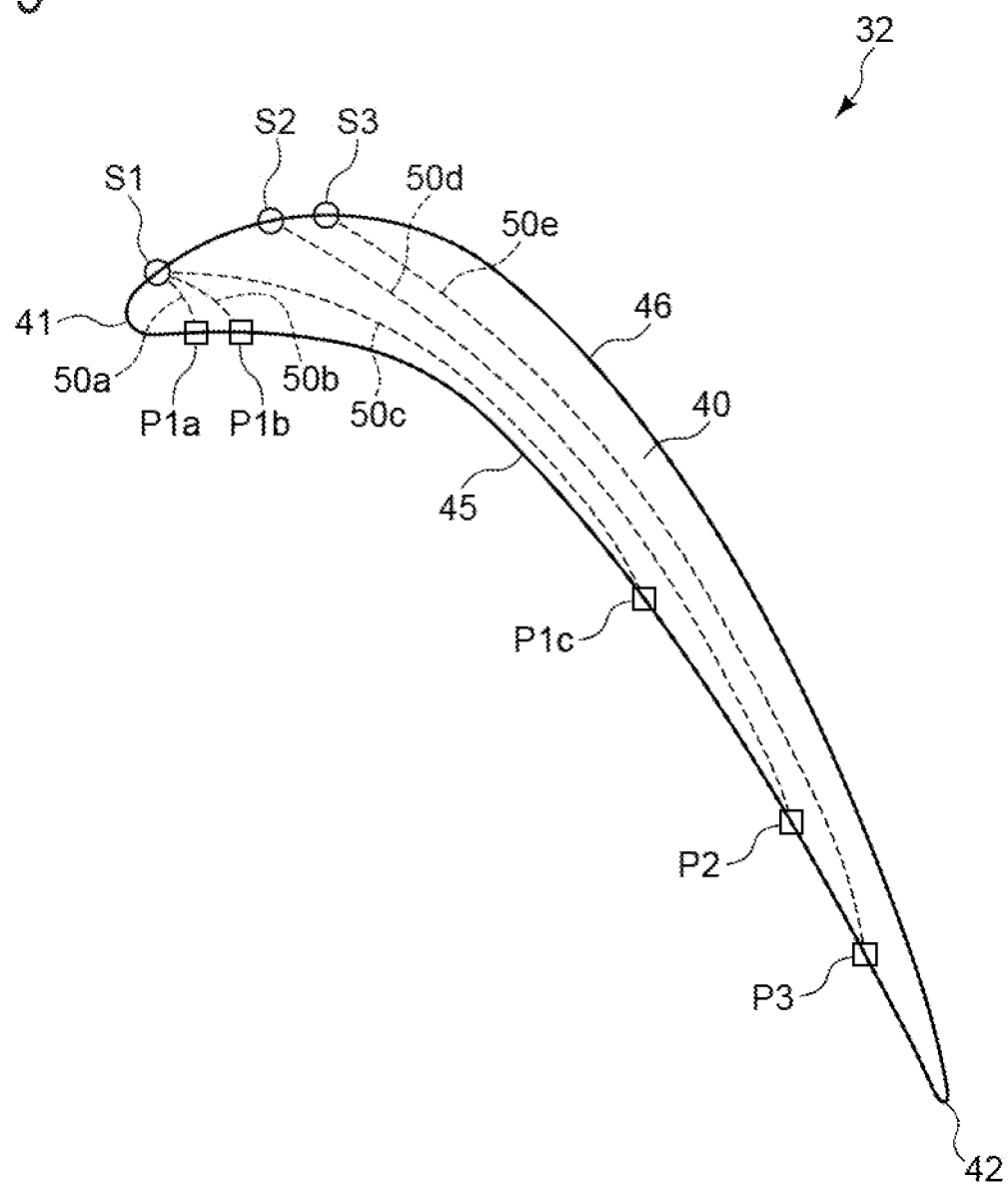
FIG. 9 is a view schematically illustrating a cross-section perpendicular to a spanwise direction of an airfoil portion according to an embodiment.

FIG. 9 is a view schematically illustrating a cross-section perpendicular to the spanwise direction of the airfoil portion 40 according to an embodiment. References P1a to P3 and S1 to S3 in FIG. 9 correspond respectively to the positions P1a to P3 on the pressure surface 45 and the positions S1 to S3 on the suction surface 46 in FIGS. 6 to 8. Further, broken lines provided respectively with references 50a to 50e in FIG. 9 represent routes of communication holes 50.

As in the example described with reference to FIG. 6, in some cases, a plurality of positions on the pressure surface 45 correspond to the position S1 on the suction surface 46. In the example illustrated in FIG. 6, three positions P1a, P1b, P1c correspond to the positions on the pressure surface 45.

In this regard, the first opening end 52 of the communication hole 50 having the second opening end 54 at the position S1 may be located at any of the positions P1a, P1b, P1c. That is, the communication hole 50 having the second opening end 54 at the position S1 may be any one of communication holes 50a to 50c. Alternatively, the airfoil portion 40 may be provided with a plurality of communication holes 50 each having the second opening end 54 at the position S1 on the suction surface 46 and each having the first opening end 52 at a corresponding position P1a, P1b, P1c on the pressure surface 45. That is, two or more of the communication holes 50a to 50c may be provided as the communication holes 50 each having the second opening end 54 at the position S1.

Further, only one or two or more of the communication holes 50a to 50e described above may be arranged as necessary at the airfoil portion 40.

In some embodiments, the blade 32 is arranged at a machine (e.g., the gas turbine I), and the first opening end 52 and the second opening end 54 of the communication hole 50 are arranged at positions satisfying a condition (b) described below. Here, the condition (b) is a condition that, during rated operation of the machine, a ratio PS1/PS2 of a static pressure PS1 at the position of the first opening end 52 on the pressure surface 45 to a static pressure PS2 at the position of the second opening end 54 on the suction surface 46 is in a range between 0.9 and 1.1 both inclusive.

Under the condition (b), the machine is designed so that a static pressure at the position of the first opening end 52 is equivalent to a static pressure at the position of the second opening end 54 during rated operation. Thus, during rated operation of the machine, the static pressure at the position of the first opening end 52 on the pressure surface 45 and the static pressure at the position of the second opening end 54 on the suction surface 46 are the same. However, when operational conditions of the machine are deviated from rated conditions, a pressure difference is apt to occur between the position of the first opening end 52 on the pressure surface 45 and the position of the second opening end 54 on the suction surface 46. Accordingly, it is possible to generate flow passing through the communication hole 50 from one opening end, out of the first opening end 52 and the second opening end 54, having a relatively high static pressure at the position on the blade surface (i.e., the opening end on the high pressure side) toward the other opening end having a relatively low static pressure (i.e., the opening end on the low pressure side). Thus, the flow through the communication hole 50 can be caused to come out onto the blade surface (i.e., the pressure surface 45 or the suction surface 46) on which the corresponding opening end is located through the opening end on the low pressure side. Due to the flow coming out through the communication hole 50, separation of fluid flowing along a surface of the airfoil portion 40, which possibly occurs in the vicinity of the corresponding blade surface, can be effectively suppressed.

In some embodiments, for example, as illustrated in FIG. 5, the first opening end 52 on the pressure surface 45 is located closer to the leading edge 41 than a point PA on the pressure surface 45 having a tangential line $LT_P$ parallel to the chord direction.

In the machine (e.g., gas turbine 1) to which the blade 32 is applied, when an incidence angle of fluid toward the blade 32 is negative (i.e., when fluid flow is oriented to be apt to collide with the suction surface 46 compared to a case under operational conditions being at a design point), in the vicinity of the pressure surface 45, separation may be apt to occur at a position closer to the trailing edge 42 than the point PA on the pressure surface 45 having the tangential line $LT_P$ parallel to the chord direction. In this regard, in the embodiment described above, since the first opening end 52 is arranged closer to the leading edge 41 than a position where separation is apt to occur in the vicinity of the pressure surface 45, fluid separation being apt to occur in the vicinity of the pressure surface 45 when the incidence angle is negative can be effectively suppressed.

Figure 10:
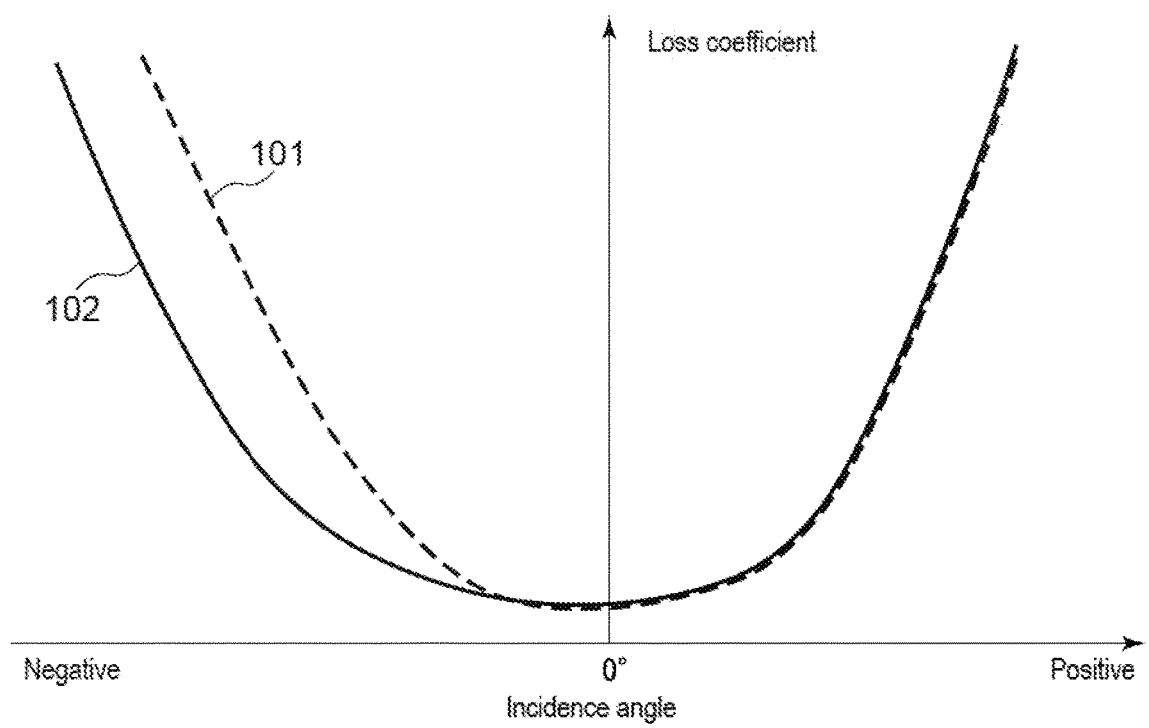
FIG. 10 is a graph illustrating an example of relations between a loss coefficient of a blade and an incidence angle.

Accordingly, as illustrated in FIG. 10, when the communication hole 50 is arranged as described above, a loss coefficient of the blade 32 can be reduced in a region where the incidence angle is negative compared to a case without the communication hole 50. FIG. 10 is a graph illustrating an example of relations between a loss coefficient of the blade 32 and an incidence angle and shows comparison between a loss coefficient 102 of the blade 32 with the communication hole 50 and a loss coefficient 101 of the blade 32 without the communication hole 50.

In some embodiments, for example, as illustrated in FIG. 5, the second opening end 54 on the suction surface 46 is located closer to the leading edge 41 than a point of an intersection Pa between the suction surface 46 and a straight line Lcam passing through the leading edge 41 and being parallel to a camber line CL of the airfoil portion 40 at the leading edge 41.

In the machine (e.g., gas turbine 1) to which the blade 32 is applied, when an incidence angle of fluid toward the blade 32 is positive (i.e., when fluid flow is oriented to be apt to collide with the pressure surface 45 compared to a case under operational conditions being at the design point), in the vicinity of the suction surface 46, separation may be apt to occur at a position closer to the trailing edge 42 than the point of the intersection $P_B$ between the suction surface 46 and the straight line Lcam passing through the leading edge 41 and being parallel to the camber line CL of the airfoil portion 40 at the leading edge 41. In this regard, in the embodiment described above, since the second opening end 54 is arranged closer to the leading edge 41 than a position where separation is apt to occur in the vicinity of the suction surface 46, fluid separation being apt to occur in the vicinity of the suction surface 46 when the incidence angle is positive can be effectively suppressed.

Figure 11:
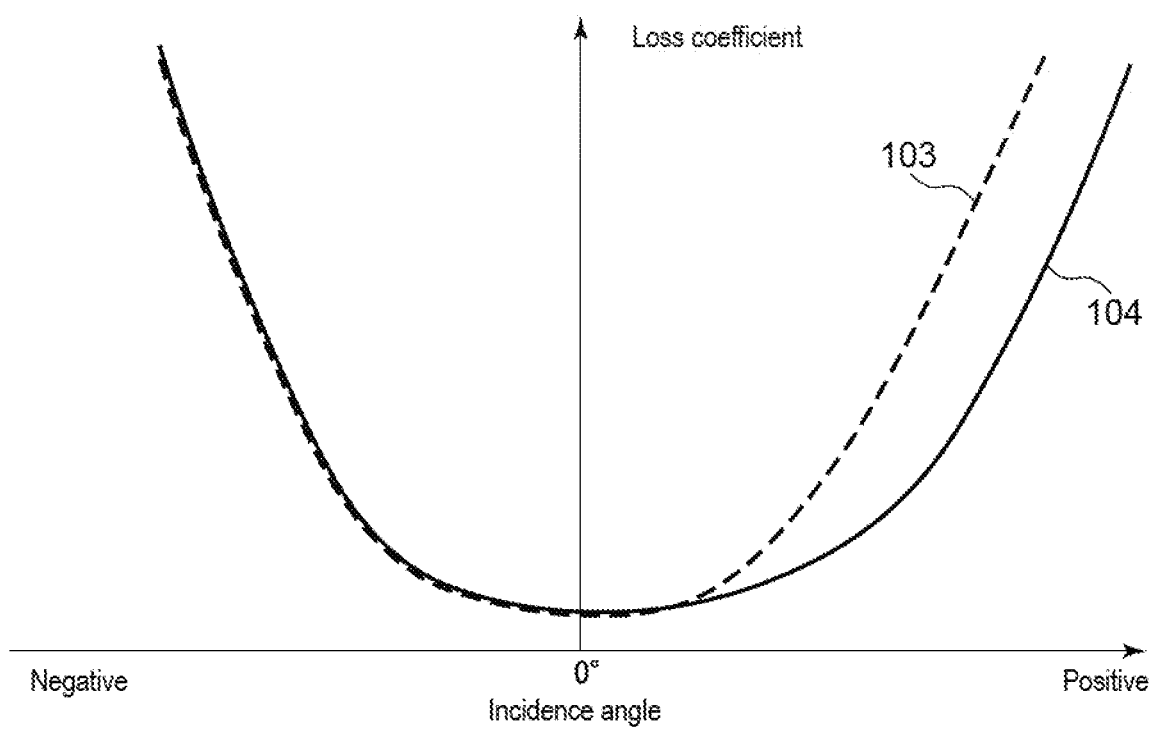
FIG. 11 is a graph illustrating an example of relations between a loss coefficient of a blade and an incidence angle.

Accordingly, as illustrated in FIG. 11, when the communication hole 50 is arranged as described above, a loss coefficient of the blade 32 can be reduced in a region where the incidence angle is positive compared to a case without the communication hole 50. FIG. 11 is a graph illustrating an example of relations between a loss coefficient of the blade 32 and an incidence angle and shows comparison between a loss coefficient 104 of the blade 32 with the communication hole 50 and a loss coefficient 103 of the blade 32 without the communication hole 50.

In some embodiments, at least one of the first opening end 52 and the second opening end 54 is located in a blade spanwise position range between 30% and 70% both inclusive, where 0% and 100% represent blade spanwise positions at both ends (the base end 43 and the tip end 44) of the airfoil portion 40 in the spanwise direction.

A center range in which a spanwise position is 30% or more and 70% or less may be important for performance in a machine (e.g., gas turbine 1) to which the blade 32 is applied. In this regard, according to the embodiment described above, at least one of the first opening end 52 and the second opening end 54 is located in the center range. Accordingly, in the region important for performance in the spanwise direction, separation of fluid flowing along the surface of the airfoil portion 40, which possibly occurs in the vicinity of the corresponding blade surface, can be effectively suppressed by the flow coming out through the communication hole 50. Thus, the above is advantageous for performance of the machine to which the blade 32 is applied.

Figure 12:
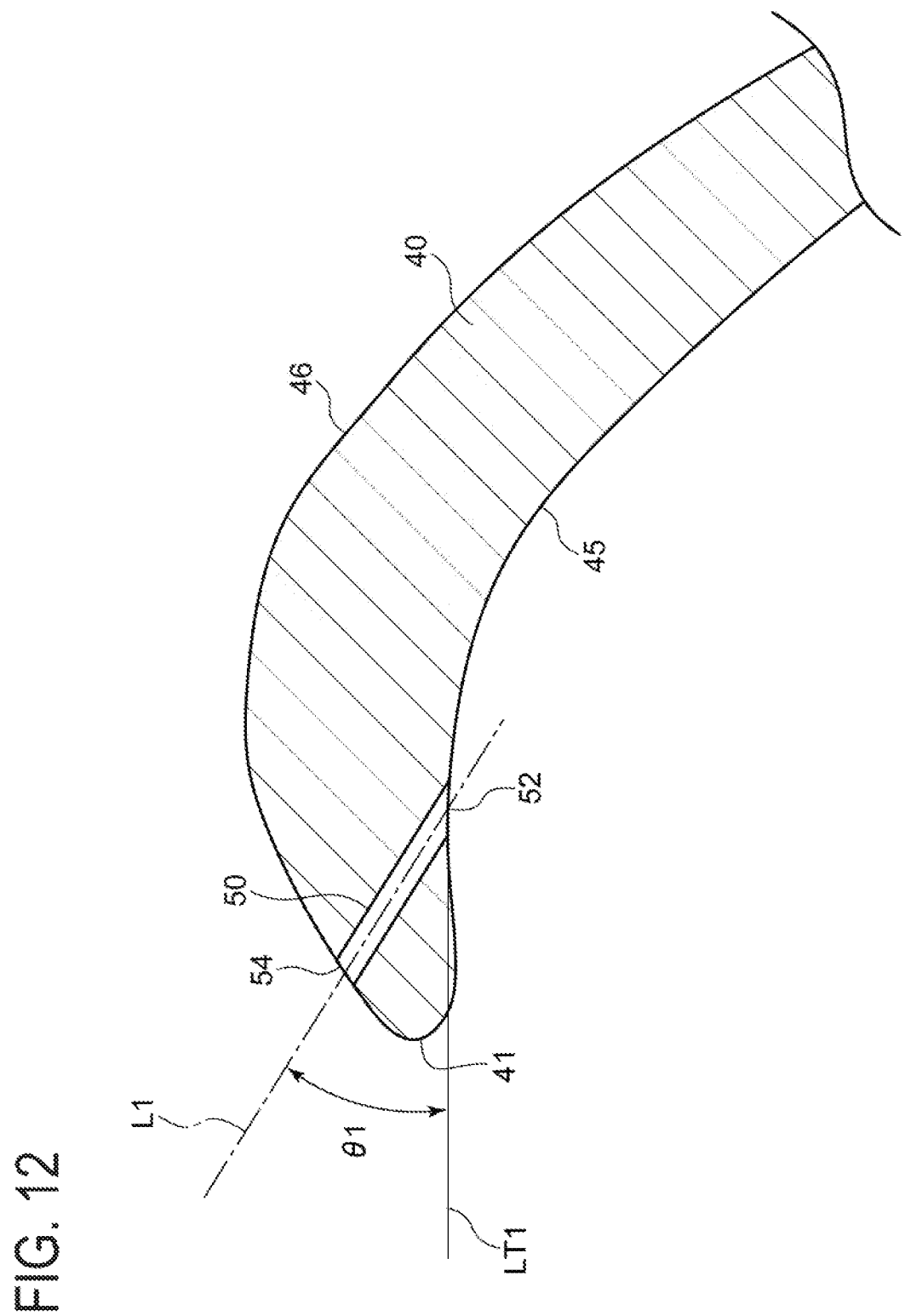
FIG. 12 is a partial cross-sectional view of an airfoil portion according to an embodiment.
Figure 13:
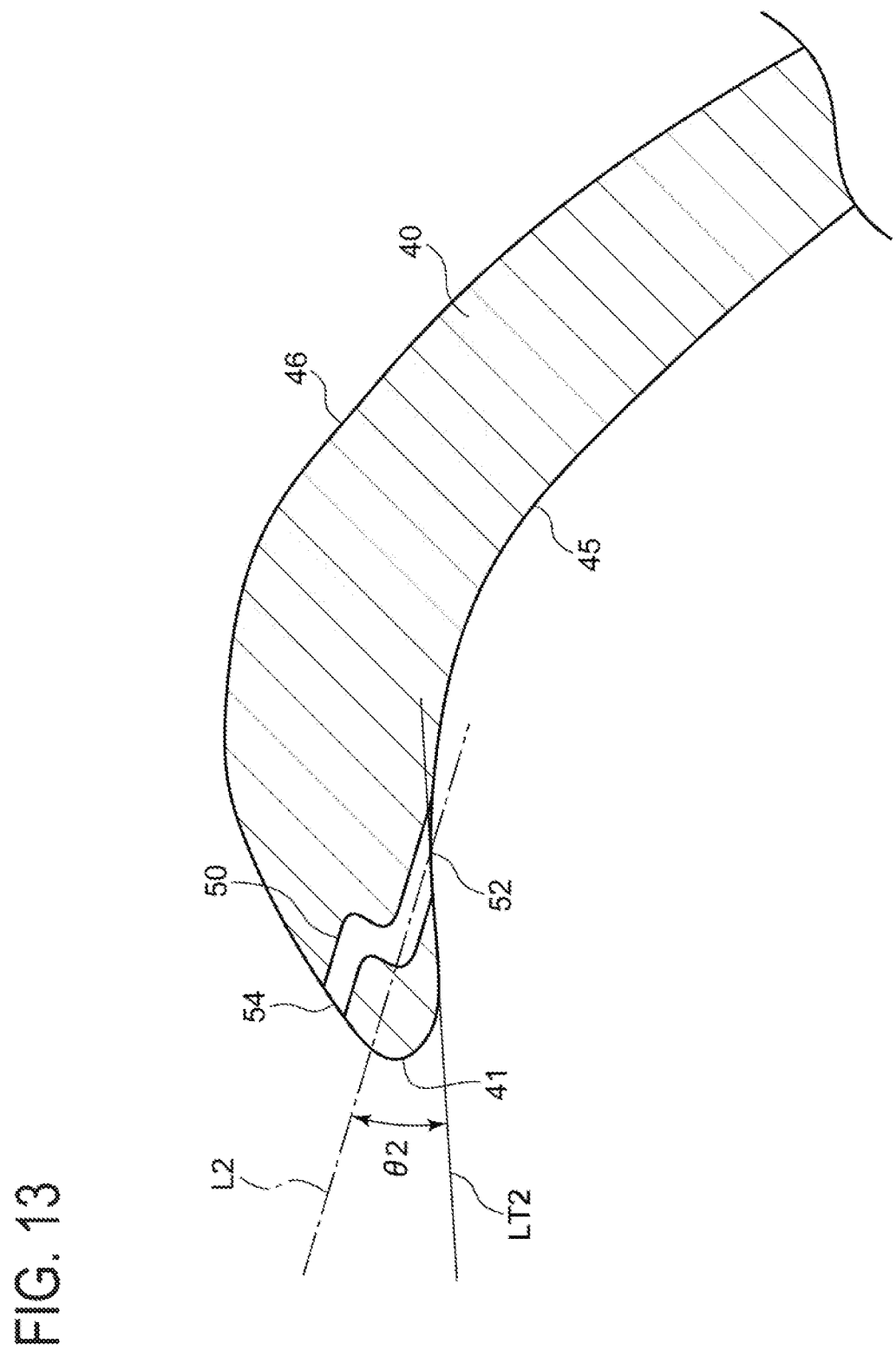
FIG. 13 is a partial cross-sectional view of an airfoil portion according to an embodiment.
Figure 14:
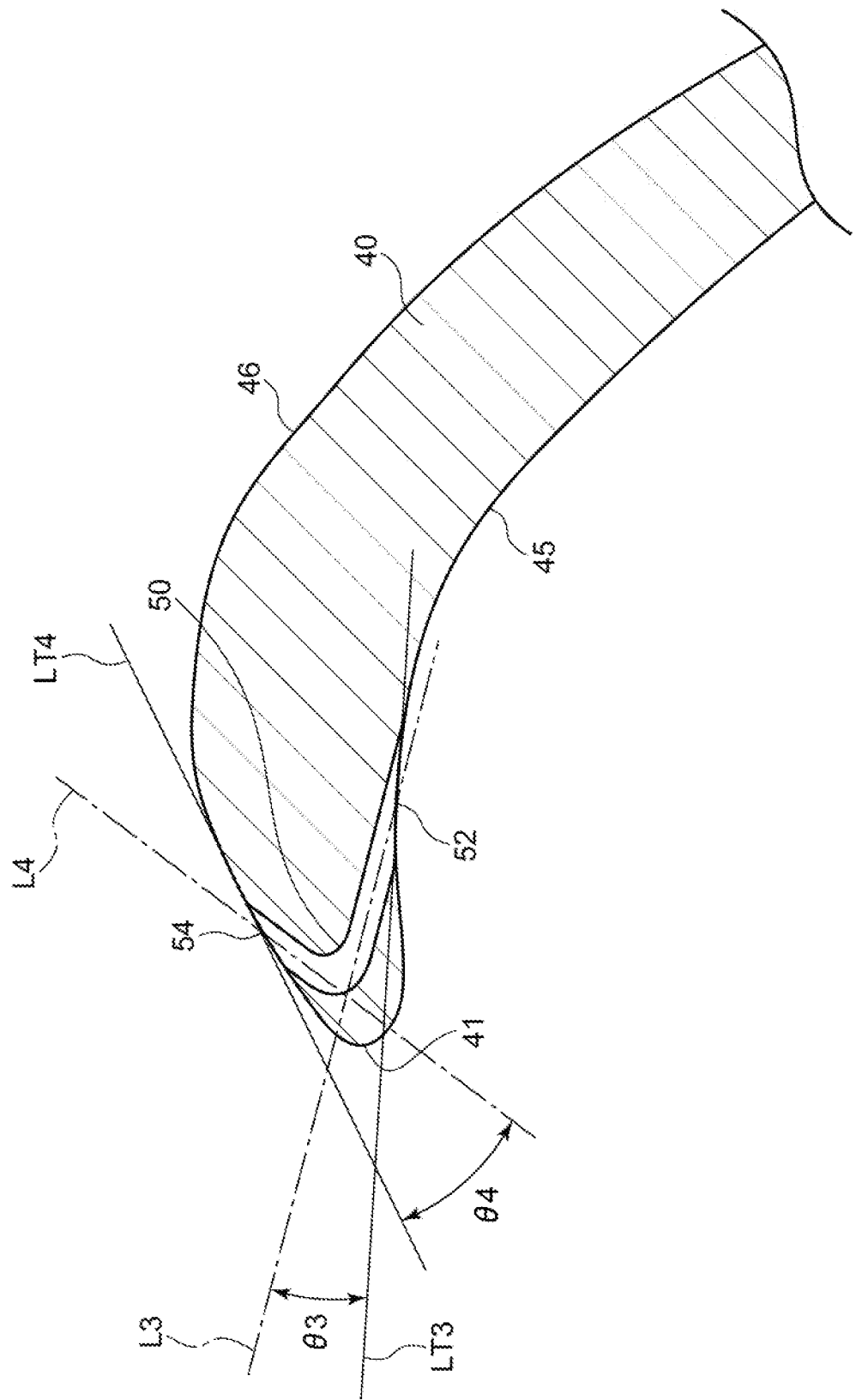
FIG. 14 is a partial cross-sectional view of an airfoil portion according to an embodiment.

Each of FIGS. 12 to 14 is a cross-sectional view of the airfoil portion 40 according to an embodiment, as illustrating a shape of the communication hole 50.

In some embodiments, for example, as illustrated in FIG. 12, the communication hole 50 extends linearly between the first opening end 52 and the second opening end 54.

In this case, since the communication hole 50 has a linear shape, the communication hole 50 can be easily formed with machine processing.

In some embodiments, for example, as illustrated in FIGS. 12 to 14, regarding the communication hole 50, an angle $\theta 1, \theta 2, \theta 3$ between the communication hole 50 at the first opening end 52 (corresponding to a direction of a straight line L1, L2, L3 in FIGS. 12 to 14) and a portion of a tangential line LT1, LT2, LT3 on the pressure surface 45 at the first opening end 52, the portion being on the leading edge 41 side from the first opening end 52, is 45 degrees or smaller. Alternatively, the angle $\theta 1, \theta 2, \theta 3$ may be 30 degrees or smaller.

In the embodiments illustrated in FIGS. 12 to 14, the direction of each of the straight lines L1, L2, L3 corresponds to the direction in which the communication hole 50 extends at the first opening end 52.

In the above case, since the communication hole 50 is shaped along the pressure surface 45 at the position of the first opening end 52, when flow from the communication hole 50 comes out through the first opening end 52, a loss caused by being mixed with fluid flowing in the vicinity of the pressure surface 45 can be effectively suppressed.

In some embodiments for example, as illustrated in FIG. 14, regarding the communication hole 50, an angle $\theta 4$ between the communication hole 50 at the second opening end 54 (corresponding to a direction of a straight line L4 in FIG. 14) and a portion of a tangential line LT4 on the suction surface 46 at the second opening end 54, the portion being on the leading edge 41 side from the second opening end 54, is 45 degrees or smaller. Alternatively, the angle $\theta 4$ may be 30 degrees or smaller.

In the embodiment illustrated in FIG. 14, the direction of the straight line L4 corresponds to the direction in which the communication hole 50 extends at the second opening end 54.

In the above case, since the communication hole 50 is shaped along the suction surface 46 at the position of the second opening end 54, when flow from the communication hole 50 comes out through the second opening end 54, a loss caused by being mixed with fluid flowing in the vicinity of the suction surface 46 can be effectively suppressed.

In some embodiments, a maximum value of cross-sectional area of the communication hole 50 is not more than five times a minimum value of cross-sectional area of the communication hole 50, and alternatively, is not more than four times the minimum value thereof.

In this case, the cross-sectional area of the communication hole 50 does not vary largely from the first opening end 52 down to the second opening end 54. Accordingly, a pressure loss at the communication hole 50 can be effectively suppressed and separation of fluid flowing along the surface of the airfoil portion 40, which possibly occurs in the vicinity of the corresponding blade surface, can be suppressed more effectively.

In some embodiments, a maximum value of cross-sectional area of the communication hole 50 at a midrange thereof is twice or more a minimum value of cross-sectional area of the communication hole 50, and alternatively, is triple or more a minimum value thereof.

In this case, the cross-sectional area of the communication hole 50 is large and flow velocity is reduced at the midrange between the first opening end 52 and the second opening end 54. Accordingly, a pressure loss at the communication hole 50 can be effectively suppressed and separation of fluid flowing along the surface of the airfoil portion 40, which possibly occurs in the vicinity of the corresponding blade surface, can be suppressed more effectively.

In the above, description has been provided on the embodiments of the present invention. However, not limited to the embodiments described above, the present invention includes modifications of the embodiments and appropriate combinations thereof.

In the present application, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, in the present application, an expression of a shape such as a rectangular shape or a cylindrical shape shall not be construed as only the geometrically strict shape, but also includes a shape with unevenness or chamfered corners within the range in which the same effect can be achieved.

Further, in the present application, an expression such as "comprise", "include", and "have" are not intended to be exclusive of other components.

The invention claimed is:

1. A blade comprising:
an airfoil portion including a pressure surface and a suction surface each extending between a leading edge and a trailing edge along a spanwise direction; and
at least one communication hole extending in the airfoil portion and each communication hole of the at least one communication hole having a first opening end opening to the pressure surface and a second opening end opening to the suction surface,
wherein the first opening end is located on a first cross-section perpendicular to the spanwise direction at a first position in the spanwise direction,
wherein the second opening end is located on a second cross-section perpendicular to the spanwise direction at a second position in the spanwise direction, and
wherein a dimensionless blade chord length position (%) of the first opening end with respect to the leading edge on the first cross-section is larger than a dimensionless blade chord length position (%) of the second opening end with respect to the leading edge on the second cross-section, and
wherein the first opening end and the second opening end are located at positions different from each other in the spanwise direction.

2. The blade according to claim 1,
wherein a maximum value of cross-sectional area of the communication hole is not more than five times a minimum value of cross-sectional area of the communication hole.

3. The blade according to claim 1,
wherein, on the first cross-section or the second cross-section, an angle A1 satisfying a condition (a) exists within an angle range between −10 degrees and 10 degrees both inclusive, around the leading edge being as a center, with respect to an extension line obtainable by extending a camber line of the airfoil portion from the leading edge, and
wherein the condition (a) is a condition that, when the airfoil portion receives fluid flow flowing from a direction of the angle A1 toward the leading edge, a static pressure at a position of the first opening end on the pressure surface is equal to a static pressure at a position of the second opening end on the suction surface.

4. The blade according to claim 1,
wherein the at least on communication hole has a single second opening end.

5. The blade according to claim 1,
wherein the first opening end is located closer to the leading edge than a point on the pressure surface having a tangential line parallel to a chord direction of the airfoil portion.

6. The blade according to claim 1,
wherein the second opening end is located closer to the leading edge than a point of an intersection between the suction surface and a straight line passing through the leading edge and being parallel to a camber line of the airfoil portion at the leading edge.

7. The blade according to claim 1,
wherein the communication hole extends linearly between the first opening end and the second opening end.

8. The blade according to claim 1,
an angle between the communication hole at the first opening end and a portion of a tangential line on the pressure surface at the first opening end, the portion being on the leading edge side from the first opening end, is 45 degrees or smaller.

9. The blade according to claim 1,
an angle between the communication hole at the second opening end and a portion of a tangential line on the suction surface at the second opening end, the portion being on the leading edge side from the second opening end, is 45 degrees or smaller.

10. The blade according to claim 1,
wherein the first opening end and the second opening end are located at the same position in the spanwise direction.

11. The blade according to claim 1,
wherein at least one of the first opening end or the second opening end is located in a blade spanwise position range between 30% and 70% both inclusive,
where 0% and 100% represent blade spanwise positions at both ends of the airfoil portion in the spanwise direction.

12. A gas turbine, comprising:
a compressor configured to generate compressed air;

a combustor configured to combust fuel together with air to generate combustion gas;

a turbine including the blade according to claim 1, the turbine being configured to be driven by the combustion gas.

13. A machine, comprising the blade according to claim 1, wherein the first opening end and the second opening end are located at positions satisfying a condition (b), and wherein the condition (b) is a condition that, during rated operation of the machine, a ratio $PS1/PS2$ of static pressure $PS1$ at a position of the first opening end on the pressure surface to static pressure $PS2$ at a position of the second opening end on the suction surface is in a range between 0.9 and 1.1 both inclusive.

14. The blade according to claim 1, wherein the first opening end is located in a blade spanwise position range of greater than 50% and at most 100%, and the second opening end is located in a blade spanwise position range of not less than 0% and at most 50%, where 0% and 100% represent blade spanwise positions at both ends of the airfoil portion in the spanwise direction.

* * * * *